United States Patent [19]
Chawla et al.

[11] Patent Number: 5,977,202
[45] Date of Patent: Nov. 2, 1999

[54] RADIATION-CURABLE COMPOSITIONS HAVING FAST CURE SPEED AND GOOD ADHESION TO GLASS

[75] Inventors: Chander P. Chawla, Batavia; Paul E. Snowwhite, Elgin; Edward P. Zahora, Naperville, all of Ill.

[73] Assignee: DSM N.V., Heerlen, Netherlands

[21] Appl. No.: 08/935,059

[22] Filed: Sep. 22, 1997

[51] Int. Cl.$^6$ .................................................. C08F 2/46
[52] U.S. Cl. ..................... 522/172; 427/516; 427/517; 428/378
[58] Field of Search ............................ 522/172; 428/378; 556/437, 418; 427/517, 415

[56] References Cited

U.S. PATENT DOCUMENTS

| | | | |
|---|---|---|---|
| 3,715,371 | 2/1973 | Thomson | 260/349 |
| 4,472,019 | 9/1984 | Bishop et al. | 350/96.3 |
| 4,474,830 | 10/1984 | Taylor | 427/54.1 |
| 4,572,610 | 2/1986 | Krajewski | 350/96.34 |
| 4,624,994 | 11/1986 | Ansel | 525/440 |
| 4,697,026 | 9/1987 | Lee et al. | 556/418 |
| 4,716,209 | 12/1987 | Schmid et al. | 526/261 |
| 4,720,529 | 1/1988 | Kimura et al. | 525/454 |
| 4,849,462 | 7/1989 | Bishop | 522/97 |
| 4,900,126 | 2/1990 | Jackson et al. | 350/46.23 |
| 4,923,915 | 5/1990 | Urruti | 524/102 |
| 5,093,386 | 3/1992 | Bishop et al. | 522/96 |
| 5,104,433 | 4/1992 | Chapin et al. | 65/3.1 |
| 5,146,531 | 9/1992 | Shuestack | 358/128 |
| 5,199,098 | 3/1993 | Nolan et al. | 385/128 |
| 5,260,350 | 11/1993 | Wright | 522/42 |
| 5,336,536 | 8/1994 | Coady et al. | 428/375 |
| 5,336,563 | 8/1994 | Coady et al. | 428/375 |
| 5,373,578 | 12/1994 | Parker et al. | 385/128 |
| 5,379,363 | 1/1995 | Bonicel et al. | 385/114 |
| 5,384,342 | 1/1995 | Szum | 522/172 |
| 5,456,984 | 10/1995 | Bishop et al. | 428/373 |
| 5,539,014 | 7/1996 | Swedo et al. | 522/172 |
| 5,595,820 | 1/1997 | Szum | 428/378 |
| 5,596,669 | 1/1997 | Murphy et al. | 385/128 |

FOREIGN PATENT DOCUMENTS

| | | |
|---|---|---|
| 0520477A1 | 12/1992 | European Pat. Off. |
| 56-136865 | 10/1981 | Japan |
| WO95/06650 | 3/1995 | WIPO |
| WO98/28308 | 7/1998 | WIPO |

OTHER PUBLICATIONS

Dewent Abstract of JP 48089287A: Polymerizable silicile acid ester compositions, Nov. 1973.
Encyclopedia of Polymer Science & Engineering, vol. 1 (1985), pp. 211–305.
"Fiber Optics", Encyclopedia of Chemical Technology, vol. 10, 4th Ed. (1993), pp. 514–538.

*Primary Examiner*—James J. Seidleck
*Assistant Examiner*—Sanza McClendon
*Attorney, Agent, or Firm*—Pillsbury Madison & Sutro Intellectual Property Group

[57] ABSTRACT

A radiation-curable composition for use as an optical fiber material or coating comprising the combination of the following pre-mixture ingredients:

(A) about 5 wt. % to about 95 wt. % of one or more radiation-curable oligomers, (B) about 5 wt. % to about 95 wt. % of one or more monomer diluents, (C) optionally, one or more photoinitiators, (D) about 0.1 wt. % to about 30 wt. % of one or more adhesion promoters represented by:

$$(R^1-L)_{4-x}-Si(OR^2)_x$$

wherein $R^1$ is a group comprising an ethylenically unsaturated radiation-curable group; and said three $R^2$ groups independently of each other are $C_1$–$C_{10}$ groups; wherein $X=1$–$3$; and L is a linking group which comprises one or more alkoxy or branched propoxy groups.

19 Claims, No Drawings

RADIATION-CURABLE COMPOSITIONS HAVING FAST CURE SPEED AND GOOD ADHESION TO GLASS

FIELD OF THE INVENTION

This invention relates to radiation-curable compositions, and in particular, to compositions which are useful as optical fiber coatings and have both good adhesion to glass and fast cure speed.

DESCRIPTION OF RELATED ART

Radiation-curable compositions are extensively used by the optical fiber industry for the production of optical fibers, ribbons, and cables. For example, optical glass fibers are routinely coated with a protective radiation-curable coating system immediately after the glass fiber is manufactured in a draw tower furnace so as to preserve the pristine character of the freshly manufactured glass fiber. Immediately after a radiation-curable coating is applied to protect the fiber, the coating is rapidly cured by exposure to radiation (commonly ultraviolet light). The industry demands faster production speeds, and therefore, faster radiation-curing coating compositions.

Usually, two radiation-curable coatings are needed to maximize fiber performance. A soft inner primary coating directly contacts the glass fiber and helps prevent microbending, and a harder outer primary coating overlays the soft inner primary coating and protects it during handling. Single coating systems are known but are not generally used at the present.

Radiation-curable matrix and bundling materials can further support and protect the individual strands of coated fiber when individual strands are bundled together into optical fiber ribbons, cables, and associated structures. Also, radiation-curable inks can be used to color code individual strands of optical fiber. All of these types of optical fiber-related materials are preferably radiation-curable, and fast cure for each is essential.

The adhesion of different optical fiber materials to one another is also very important. However, combinations of properties can be difficult to achieve.

Examples of radiation-curable inner primary coatings are disclosed in U.S. Pat. No. 5,336,563 to Coady et al and of outer primary coatings in U.S. Pat. No. 4,472,019 to Bishop et al. Additional aspects of optical fiber coating technology are disclosed in, for example, U.S. Pat. Nos. 5,595,820 to Szum; 5,199,098 to Nolan et al.; 4,923,915 to Urruti et al.; 4,720,529 to Kimura et al.; and 4,474,830 to Taylor et al.

To maximize cure speed in an ultraviolet light cure, at least one photoinitiator is required (although photoinitiator may be omitted in an electron beam cure). Several photoinitiators can be used to achieve a suitable balance of surface and through cure. Mono-acyl phosphine oxide type photoinitiators can be used such as Lucirin TPO (2,4,6-trimethylbenzoyl)diphenyl phosphine oxide, which exhibits relatively fast cure speed but can also generate undesirable crystallization effects. Other phosphine oxide photoinitiators can show reduced amounts of harmful crystallization effect, but they may also have slower cure speed or cause yellowing. This illustrates again how it can be difficult to achieve fast cure speed in combination with other desirable properties.

Fast cure is particularly difficult to achieve with inner primary coatings. For these coatings, fast-cure must not be achieved without loss of adhesion to the glass fiber. U.S. Pat. No. 4,849,462 to Bishop teaches that the silane adhesion promoter, mercaptopropyltrimethoxy silane, is particularly useful for improving adhesion to optical glass fiber. Adhesion promotion is particularly important under wet aging conditions. However, despite their advantages, the mercaptosilane and other typical silane adhesion promoters also tend to decrease cure speed. The mercaptosilane adhesion promoter also tends to reduce coating modulus and liquid coating shelf life.

By way of example, the aforementioned U.S. Pat. No. 5,336,563 to Coady et al discloses use of silane adhesion promoters and cure speed measurements for inner primary coatings. According to this patent, cure speeds of 0.45, 0.32, and 0.37 $J/cm^2$ (measured as dose at 95% maximum attainable modulus) are rapid based on industrial standards. This patent, however, does not teach or suggest how to prepare compositions having cure speed of less than about 0.2 $J/cm^2$. More specifically, this patent does not teach or suggest how to attain both fast cure speed and good wet adhesion.

SUMMARY OF THE INVENTION

An object of the present invention is to provide radiation-curable compositions having both fast cure speed and good adhesion to glass. An additional object is to provide compositions having both fast cure speed and good interlayer adhesion.

These and other objects are achieved by a radiation-curable composition for use as an optical fiber coating or material comprising the combination of the following pre-mixture ingredients:

(A) about 5 wt. % to about 95 wt. % of one or more radiation-curable oligomers, (B) about 5 wt. % to about 95 wt. % of one or more monomer diluents, (C) optionally, one or more photoinitiators, (D) about 0.1 wt. % to about 30 wt. % of one or more adhesion promoters represented by:

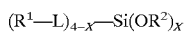

$$(R^1\text{—}L)_{4-x}\text{—}Si(OR^2)_x$$

wherein $R^1$ is a group comprising an ethylenically unsaturated radiation-curable group; wherein said three $R^2$ groups independently of each other are $C_1$–$C_{10}$ groups; wherein X–1–3; and wherein L is a linking group which comprises one or more alkoxy groups (E) optionally, 0.1 to about 30% of one or more other adhesion promoters, e.g., γ-mercaptopropyl trimethoxysilane, γ-mercaptopropyl triethoxysilane, γ-mercaptopropyl tripropoxysilane, γ-mercaptopropyl trimethoxyethoxysilane, acryloxypropyl trimethoxysilane, methacryloxypropyl trimethoxysilane, glycidoxypropyl trimethoxy silane as well as polymeric silanes and other silanes.

The present invention also provides radiation-cured forms of the radiation-curable composition, as well as coated optical fibers comprising this radiation-cured form. The present invention also provides optical fiber cable and ribbon assemblies and methods of making coated optical fiber.

DETAILED DESCRIPTION OF THE PRESENT INVENTION

Known examples of radiation-curable compositions for optical fiber materials and coatings can be found in, for example, U.S. Pat. Nos. 5,384,342; 5,456,984; 5,596,669;

5,336,563; 5,093,386; 4,716,209; 4,624,994; 4,572,610; and 4,472,019. These references teach one skilled in the art how to formulate and use compositions based on acrylate-functionalized oligomers and monomer diluents.

For this invention, "pre-mixture ingredient" means an ingredient before it is mixed with other ingredients. When formulating a radiation-curable composition from its pre-mixture ingredients, some interaction or reaction of the ingredients may be possible after mixing. However, pre-mixture ingredient refers to the identity of the ingredient before mixing. The present invention is not generally limited by the order in which the pre-mixture ingredients are mixed.

"(Meth)acrylate" means acrylate, methacrylate, or a mixture thereof.

The oligomer system A comprises one or more radiation-curable oligomers. The radiation-curable oligomer(s) A can be any known radiation-curable oligomer used in radiation-curable optical fiber material or coating compositions. An example of a suitable radiation-curable oligomer A includes a urethane oligomer having a molecular weight of at least about 500 and containing at least one ethylenically unsaturated group that can be polymerized through actinic radiation. Preferably, the oligomer A is substantially free of isocyanate functionality. Preferably, the oligomer A has two terminal radiation-curable functional groups, one at each end of the oligomer. Urethane-free oligomers may also be used in this composition.

The radiation-curable oligomer system A is preferably present in an amount of about 5 to about 95% by weight, and more preferably, about 20 to about 80% by weight. If multiple oligomers are used, the amounts of each oligomer are added to determine the amount of oligomer system A. All weight percentages used herein are relative to the total weight of the composition unless indicated otherwise.

Examples of suitable radiation-curable functional groups for oligomer(s) A include ethylenically unsaturated groups having (meth)acrylate, vinylether, acrylamide, maleimides, maleate or fumarate functionality. Preferably, the radiation-curable group in the oligomer A is a (meth)acrylate or vinylether group. Most preferably, the radiation-curable group is an acrylate group.

Another type of radiation-curable functionality generally used is provided by, for example, epoxy groups, or thiol-ene or amine-ene systems. Epoxy groups can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

Preferably, the oligomer A contains at least two ethylenically unsaturated groups which are bound to an oligomer backbone. For example, ethylenically unsaturated groups can be present at each end of the oligomer backbone as reactive termini.

The oligomer backbone can comprise one or more polymer blocks of repeating units coupled with each other via, for example, urethane linkages. Methods to allow for such coupling are known in the art. For example, oligomer A can be prepared by reaction of (i) an oligomer polyol, (ii) a diisocyanate compound, and (iii) a hydroxy functional ethylenically unsaturated monomer such as, for example, hydroxyalkyl(meth)acrylate.

Preferably, the oligomer backbone comprises repeat units of polyether, polyolefin, polyester, polycarbonate, or mixtures thereof. Alternatively, acrylated acrylic type oligomers can be used. If the oligomer backbone is a polyether, the resulting materials generally have a low glass transition temperature and good mechanical properties. If the oligomer backbone is a polyolefin, the resulting materials generally have further improved water resistance.

If an oligomer backbone polyol is used, preferably it has on average at least about 2 hydroxyl groups. The oligomer backbone polyol may have, on average, more than 2 hydroxyl groups. Examples of such an oligomer diol include polyether diols, polyolefin diols, polyester diols, polycarbonate diols, and mixtures thereof. Polyether and polyolefin diols, or combinations thereof, are preferred.

If a polyether diol is used, preferably the polyether is a substantially non-crystalline polyether. Preferably, the polyether comprises repeating units of one or more of the following monomer groups:

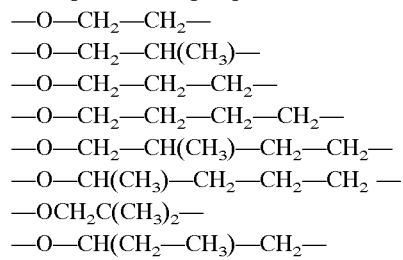

Hence, the polyether can be made from epoxy-ethane, epoxy-propane, tetrahydrofuran, methyl-substituted tetrahydrofuran, epoxybutane, and the like.

An example of a polyether polyol that can be used is the polymerization product of 20 percent by weight of 3-methyltetrahydrofuran and 80 percent by weight of tetrahydrofuran, both of which have undergone a ring opening polymerization. This polyether copolymer contains both branched and non-branched oxyalkylene repeating units and is marketed as PTG-L 1000 (Hodogaya Chemical Company of Japan). Another example of a polyether that can be used is PTG-L 2000 (Hodogaya Chemical Company).

If a polyolefin diol is used, the polyolefin is preferably a linear or branched hydrocarbon containing a plurality of hydroxyl end groups. Preferably, the hydrocarbon is a non-aromatic compound containing a majority of methylene groups ($-CH_2-$) and which can contain internal unsaturation and/or pendent unsaturation. Fully saturated, for example, hydrogenated hydrocarbons, are preferred because the long term stability of the cured optical fiber coating increases as the degree of unsaturation decreases. Examples of hydrocarbon diols include, for example, hydroxyl-terminated, fully or partially hydrogenated 1,2-polybutadiene; 1,4- 1,2-polybutadiene copolymers, 1,2-polybutadiene-ethylene or -propylene copolymers, polyisobutylene polyol; mixtures thereof, and the like. Preferably, the hydrocarbon diol is a substantially, fully hydrogenated 1,2-polybutadiene or 1,2-polybutadiene-ethene copolymer.

Examples of polycarbonate diols are those conventionally produced by the alcoholysis of diethylene carbonate with a diol. The diol can be, for example, an alkylene diol having about 2 to about 12 carbon atoms, such as, 1,4-butane diol, 1,6-hexane diol, 1,12-dodecane diol, and the like. Mixtures of these diols can also be utilized. The polycarbonate diol can contain ether linkages in the backbone in addition to carbonate groups. Thus, for example, polycarbonate copolymers of alkylene oxide monomers and the previously described alkylene diols can be used. Alkylene oxide monomers include, for example, ethylene oxide, tetrahydrofuran, and the like. These copolymers produce cured coatings that exhibit a lower modulus and also inhibit crystallinity of the liquid coating composition compared to polycarbonate diol homopolymers. Admixtures of the polycarbonate diols and polycarbonate copolymers can also be utilized.

Polycarbonate diols include, for example, Duracarb 122 (PPG Industries) and Permanol KM10-1733 (Permuthane, Inc., Mass.). Duracarb 122 is produced by the alcoholysis of diethylcarbonate with hexane diol.

Examples of polyester diols include the reaction products of saturated polycarboxylic acids, or their anhydrides, and diols. Saturated polycarboxylic acids and anhydrides include, for example, phthalic acid, isophthalic acid, terephthalic acid, trimellitic acid, tetrahydrophthalic acid, hexahydrophthalic acid, tetrachlorophthalic acid, adipic acid, azelaic acid, sebacic acid, succinic acid, glutaric acid, malonic acid, pimelic acid, suberic acid, 2,2-dimethylsuccinic acid, 3,3-dimethylglutaric acid, 2,2-dimethylglutaric acid, the like, anhydrides thereof and mixtures thereof. Diols include, for example, 1,4-butanediol, 1,8-octane diol, diethylene glycol, 1,6-hexane diol, dimethylol cyclohexane, and the like. Included in this classification are the polycaprolactones, commercially available from Union Carbide under the trade designation Tone Polyol series of products, for example, Tone 0200, 0221, 0301, 0310, 2201, and 2221. Tone Polyol 0301 and 0310 are trifunctional.

One or more polyisocyanates can also be used to prepare oligomer A. Any known organic polyisocyanate (ii), alone or in admixture, can be used as the polyisocyanate. However, aliphatic, non-aromatic polyisocyanates are preferred if non-yellowing is to be achieved.

Generally, in oligomer synthesis, an oligomer product is obtained which is end-capped with the reaction product from the isocyanate/ethylenically unsaturated monomer reaction on at least one end of the ligomer molecule. "End-capped" means that a functional group caps an end of the oligomer diol.

The isocyanate/hydroxy functional monomer reaction product attaches to the oligomer backbone (i) diol via a urethane linkage. The urethane reactions can take place in the presence of a catalyst. Catalysts for the urethane reaction include, for example, diazabicyclooctane crystals and the like.

Preferably the polyisocyanate (ii) is a diisocyanate. Examples of diisocyanates (ii) include tetramethylxylylene diisocyanate (TMXDI), isophorone diisocyanate (IPDI), toluene diisocyanate (TDI), diphenylmethylene diisocyanate, hexamethylene diisocyanate, cyclohexylene diisocyanate, methylene dicyclohexane diisocyanate, 2,2,4-trimethyl hexamethylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, and polyalkyloxide and polyester glycol diisocyanates such as polytetramethylene ether glycol terminated with TDI and polyethylene adipate terminated with TDI, respectively. Preferably, the isocyanates are TDI or IPDI.

Generally the compound providing a reactive terminus (iii) contains a functional group which can polymerize under the influence of actinic radiation, and the compound contains a functional group which can react with the diisocyanate. Hydroxy functional ethylenically unsaturated monomers are preferred. More preferably, the hydroxy functional ethylenically unsaturated monomer contains acrylate, (meth)acrylate, vinyl ether, maleate or fumarate functionality.

In the reaction between hydroxy group of (i) and isocyanate groups of (ii), it is preferred to employ a stoichiometric balance between hydroxy and isocyanate functionality and to maintain the reaction temperature of at least 25° C. The hydroxy functionality should be substantially consumed. The hydroxy functional ethylenically unsaturated monomer attaches to the isocyanate via a urethane linkage. Monomers having (meth)acrylate functional groups include, for example, hydroxy functional acrylates such as 2-hydroxyethyl acrylate, 2-hydroxypropyl acrylate, and the like. Monomers having vinyl ether functional groups include, for example, 4-hydroxybutyl vinyl ether, and triethylene glycol monovinyl ether. Monomers having maleate functional groups include, for example, maleic acid and hydroxy functional maleates.

Alternatively, the radiation-curable oligomer A can be an acrylic oligomer comprising at least one radiation-curable (meth)acrylate group, and preferably, at least one acrylate group. These are known in the art as acrylated acrylics.

The invention is not believed to be limited by how the acrylated acrylic oligomer, or any other oligomer, is prepared. Oligomer synthetic routes for acrylated acrylics can, for example, involve an esterification of a hydroxyl-functional acrylic oligomer with (meth)acrylic acid, or the reaction of an epoxy-functional acrylic oligomer with (meth)acrylic acid. These acrylated acrylics can include urethane linkages.

Acrylic monomers which can be used to prepare the acrylic oligomer can be represented as the esters represented in formula (1), $$CH_2=CHCOOR \quad (1)$$

In formula (1), the acrylic monomers can be various types of esters including, for example, n-alkyl esters, secondary and branched-chain alkyl esters, esters of olefinic alcohols, aminoalkyl esters, esters of ether alcohols, cycloalkyl esters, and esters of halogenated alcohols, glycol diacrylates.

Methacrylic monomers, $CH_2=C(CH_3)COOR$, which are analogous to those of the acrylic monomers in formula (1) can also be used. In general, monomers represented as $CH_2=CR_1COOR$ can be used wherein $R_1$ is a $C_1$–$C_6$ alkyl.

N-alkyl esters in formula (1) include R being methyl, ethyl, propyl, butyl, pentyl, hexyl, heptyl, octyl, nonyl, decyl, dodecyl, tetradecyl, hexadecyl;

secondary and branched-chain alkyl esters in formula (1) include R=isopropyl, isobutyl, sec-butyl, 2-ethylhexyl, 2-ethyl butyl;

esters of olefinic alcohols in formula (1) include R=allyl, 2-methylallyl, furfuryl, 2-butenyl;

aminoalkyl esters in formula (1) include R=2-(dimethylamino)ethyl, 2-(diethylamino)ethyl, 2-(dibutylamino)ethyl, and 3-(diethylamino)propyl;

esters of ether alcohols include R=2-methoxyethyl, 2-ethoxyethyl, tetrahydrofurfuryl, 2-butoxyethyl;

cycloalkyl esters include R=cyclohexyl, 4-methylcyclohexyl, 3,3,5-trimethylcyclohexyl, 3,3,5-trimethylcyclohexyl, styrenes and vinyl acetate;

esters of halogenated alcohols include R=2-bromoethyl, 2-chloroethyl, 2,3-dibromopropyl;

esters of glycol diacrylates include R=ethylene glycol (monoester), ethylene glycol, propylene glycol, 1,3-propanediol, 1,4-butanediol, diethylene glycol, 1,5-pentane diol, triethylene glycol, dipropylene glycol, 2,5-hexanediol, 2,2-diethyl-1,3-propanediol, 2-ethyl-1, 3-hexanediol, and 1,10-decanediol.

Additional (meth)acrylic acid and ester polymers are disclosed in, for example, *Encyclopedia of Polymer Science & Engineering*, Vol. 1, 1985, pgs. 211–305, the complete disclosure of which is hereby incorporated by reference.

Acrylated acrylics can be prepared by known synthetic methods including, for example, (1) partial esterification of acrylic polymers having pendant carboxylic acid group with hydroxyethyl acrylate or glycidyl methacrylate, or in the alternative, acrylation of glycidyl methacrylate terpolymer with acrylic acid, or (2) polymerization of monomers which already have acrylate groups such as, for example, allyl methacrylate or N,N-dimethylaminoethyl methacrylate.

The acrylic oligomer typically will have a copolymeric backbone. The Tg of the oligomer can be lowered by decreasing the content of methyl methacrylate.

The compositions according to the invention also comprise a monomer, or reactive, diluent system which comprise at least one, and preferably at least two, monomer diluent compounds. The reactive diluent can be used to adjust the viscosity of the coating composition. Thus, the reactive diluent can be a low viscosity monomer containing at least one functional group capable of polymerization when exposed to actinic radiation.

The reactive diluent is preferably added in such an amount that the viscosity of the coating composition is in the range of about 1,000 to about 10,000 mPa.s. However, there is no particular limitation on viscosity, and it can be adjusted to a given application by known methods. For example, viscosity can be adjusted depending on the type of optical fiber material being formulated and the method of application.

Suitable amounts of the reactive diluent system have been found to be about 5 wt % to about 95 wt %, and more preferably, about 20 wt. % to about 80 wt. %, and more preferably, about 30 wt. % to about 70 wt. %. If more than one reactive diluent is present, the amounts of reactive diluent are added together to determine the amount of the diluent system.

The radiation-curable functional group present on the reactive diluent may be of the same nature as that used in the radiation-curable oligomer. Preferably, the radiation-curable functional group present in the reactive diluent is capable of copolymerizing with the radiation-curable functional group present on the radiation-curable oligomer. Ethylenic unsaturation is preferred. In particular, acrylate unsaturation is preferred.

Preferably, the reactive diluent system comprises a monomer or monomers having an acrylate or vinyl ether functionality and a $C_4$–$C_{20}$ alkyl or polyether moiety. Examples of such reactive diluents include hexylacrylate, 2-ethylhexylacrylate, isobornylacrylate, decylacrylate, laurylacrylate, stearylacrylate, ethoxyethoxy-ethylacrylate, laurylvinylether, 2-ethylhexylvinyl ether, N-vinyl formamide, isodecyl acrylate, isooctyl acrylate, vinylcaprolactam, N-vinylpyrrolidone, acrylamide, nonylphenol acrylate and the like.

Another preferred type of reactive diluent is a compound comprising an aromatic group. Examples of diluents having an aromatic group include:

ethyleneglycolphenyletheracrylate,
polyethyleneglycolphenyletheracrylate,
polypropyleneglycolphenyletheracrylate, and
alkyl-substituted phenyl derivatives of the above monomers, such as
polyethyleneglycolnonylphenyletheracrylate.

Furthermore, a reactive diluent can contain two groups capable of polymerization using actinic radiation. A diluent having three or more of such reactive groups can be present as well. Examples of such monomers include:

$C_2$–$C_{18}$ hydrocarbondioldiacrylates,
$C_4$–$C_{18}$ hydrocarbondivinylethers,
$C_3$–$C_{18}$ hydrocarbontrioltriacrylates,
the polyether analogs thereof, and the like, such as
1,6-hexanedioldiacrylate,
trimethylolpropanetriacrylate,
hexanedioldivinylether,
triethyleneglycoldiacrylate,
pentaeritritoltriacrylate,
tripropyleneglycol diacrylate
alkoxylated bisphenol A diacrylate.

Preferably, the oligomer and the reactive diluent each contain an acrylate group as a radiation-curable group.

The composition may optionally further comprise at least one photoinitiator. Photoinitiator is required for a fast UV cure but may be omitted for electron beam cure. Conventional photoinitiators can be used. Examples include benzophenones, acetophenone derivatives, such as alpha-hydroxyalkylphenylketones, benzoin alkyl ethers and benzil ketals, monoacylphosphine oxides, and bisacylphosphine oxides. A preferred photoinitiator is 1-hydroxycyclohexylphenylketone (IRGACURE 184, Ciba Geigy). Another preferred example is LUCIRIN TPO (BASF). Often, mixtures of photoinitiators provide a suitable balance of properties. Maleimide can be used as a photoinitiator with compositions comprising acrylics. Maleimide and vinyl ethers can be photopolymerized without the need of photoinitiators.

The amount of photoinitiator system is not particularly limited but will be effective to provide fast cure speed, reasonable cost, good surface and through cure, and lack of yellowing upon aging. Typical amounts can be, for example, about 0.3 wt. % to about 10 wt. %, and preferably, about 1 wt. % to about 5 wt. %.

The compositions according to the present invention further comprise one or more adhesion promoters represented by the formula (2):

$$(R^1-L)_{4-X}-Si(OR^2)_X \qquad (2)$$

wherein $R^1$ is a group comprising one or more ethylenically unsaturated radiation-curable group; and said three $R^2$ groups independently of each other are $C_1$–$C_{10}$ groups; wherein X=1 3; and L is a linking group which comprises one or more alkoxy groups and preferably one or more branched propoxy groups. In addition, L may contain additional groups; for example, a propyl group or an aminopropylene group.

The ethylenically unsaturated radiation-curable group in $R^1$ can be any group discussed above with respect to the radiation-polymerizable oligomers or diluents. An (meth) acrylate group is preferred, and an acrylate group is more preferred One or more of the $R^2$ groups should allow the propoxylated silane compound to be hydrolyzable. In particular, they should allow at least one, and preferably two or three, of the —Si—O—$R^2$ linkages to readily react with water at room temperature to form —Si—O—H linkages, which can further condense to form —Si—O—Si— linkages. The $R^2$ group is preferably a $C_1$–$C_{10}$ group, and more preferably, a $C_1$–$C_6$ group. The $R^2$ group is preferably an alkyl group such as methyl or ethyl or an alkyl ether group such as 2-methoxyethyl or 2-ethoxyethyl The linking group L should contain at least one alkoxy group, and preferably a propoxy group, and the silane adhesion promoter is preferably propoxylated. Preferably, the linking group L contains at least one branched propoxy group of the type —[OCH$_2$CH(CH$_3$)]— or —[OCH(CH$_3$)CH$_2$]— rather than a linear propoxy group of the type —[OCH$_2$CH$_2$CH$_2$]. Combinations of propoxy groups of the type —[OCH$_2$CH(CH$_3$)]— or —[OCH(CH$_3$) CH$_2$]— can be used. Preferably, a propoxy group is directly bonded to the radiation-curable group which, preferably, is acrylate.

In first[1] and second[2] preferred embodiments, the propoxy group-containing adhesion promoter is represented by the following formulas:

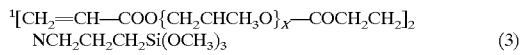
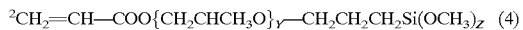

$$^1[CH_2=CH—COO\{CH_2CHCH_3O\}_X—COCH_2CH_2]_2$$
$$NCH_2CH_2CH_2Si(OCH_3)_3 \quad (3)$$

$$^2CH_2=CH—COO\{CH_2CHCH_3O\}_Y—CH_2CH_2CH_2Si(OCH_3)_Z \quad (4)$$

wherein R$^3$ is H or methyl and X can be about 1–10. Preferably, X is equal to about 4. X may represent a statistical average wherein different silane molecules have different levels of propoxylation. Y=1–10 and Z=1–3.

A preferred example of the silane compound is PRO 1779 available from Sartomer.

The amount of the silane adhesion promoter, or mixture thereof, can be about 0.1 wt. % to about 30 wt. %, and preferably, about 0.3 wt. % to about 5 wt. %, and more preferably, about 0.5 wt. % to about 3 wt. %.

Small amounts of other types of silane adhesion promoters, which do not include branched propoxy groups, can be included. Examples of other types of silane adhesion promoters includes γ-mercaptopropyl trimethoxysilane, γ-mercaptopropyl triethoxysilane, γ-mercaptopropyl tripropoxysilane, γ-mercaptopropyl trimethoxyethoxysilane, acryloxypropyl trimethoxysilane, methacryloxypropyl trimethoxysilane, glycidoxypropyl trimethoxy silane as well as polymeric silanes. However, they are preferably excluded in favor of the propoxylated silane compound. If present, other types of silane adhesion promoters can be used in amounts of 0.3 wt. % or less, and preferably, 0.1 wt. % or less.

Silane adhesion promoters, or coupling agents, are discussed in E. P. Plueddemann's Silane Coupling Agents, Plenum Press, New York 1982, which can guide one skilled in the art on the preparation and use of silanes.

Additives are commonly used in radiation-curable coatings, including optical fiber coatings, and known additives can be used in effective amounts. For example, slip agents may be used to reduce the coefficient of friction and thermal antioxidants may be used to improve thermal and oxidative stability. Some examples of antioxidants are IRGANOX 1076, CYAGARD AO 711, IRGANOX 1036, IRGANOX 245, and IRGANOX 1010. Other representative additives include stabilizers well-known in the art to prevent gelation, UV screening compounds, leveling agents, polymerization inhibitors, light stabilizers, chain transfer agents, colorants including pigments and dyes, plasticizers, fillers, wetting improvers, preservatives, and the like. Other polymers and oligomers can be added to the compositions as needed.

Moisture content in the coatings is preferably minimized.

Known thermal antioxidants can be used to further increase thermo-oxidative stability. In a preferred embodiment, the thermal antioxidant such as Irganox 245 or Irganox 1035 (Ciba Geigy) is used. The amount of antioxidant can be about 0.1 wt. % to about 5 wt. %, and preferably, about 0.3 wt. % and about 2 wt. %.

For an inner primary coating, cure speed is preferably about 0.5 J/cm$^2$ or less (at 95% of maximum attainable modulus), and more preferably, about 0.3 J/cm$^2$ or less, and even more preferably, about 0.2 J/cm$^2$ or less.

For an outer primary coating or matrix material, cure speed is preferably about 0.5 J/cm$^2$ or less (at 95% of maximum attainable modulus), and more preferably, about 0.3 J/cm$^2$ or less, and even more preferably, about 0.2 J/cm$^2$ or less.

For a cured coating composition, the dry adhesion values as determined by the test procedures section described herein range from about 5 to 1000 and the wet adhesion values range from about 1 to 900.

For an inner primary coating, the segment modulus is preferably about 0.1 MPa to about 10 MPa. Tensile strength is preferably at least about 0.2 MPa, more preferably, at least about 0.3 MPa and most preferably about 0.7 to about 3.5. Elongation is preferably about 30% or more, and more preferably, about 40% or more. There are no particular upper limits on tensile strength and elongation, but in general, tensile strength will be less than about 10 MPa, and elongation will be less than about 400%.

For an inner primary coating, refractive index is preferably about 1.47 or above, and more preferably, about 1.48 or above.

Conventional methods in the radiation-cure and optical fiber arts can be used to cure the compositions including electron-beam and UV cure. Thermal cure is less preferred, although some thermal cure may possibly occur under a hot UV lamp. UV cure is preferred. Electron beam cure provides the advantage that photoinitiators may be omitted.

The production of and useful characteristics for coated optical fibers are discussed in, for example, U.S. Pat. No. 5,104,433, which is hereby incorporated by reference. Single mode or multimode fiber can be prepared by known methods. Step index and graded index fibers can be prepared by known methods. In the coated fiber, loss due to absorption, scattering, macrobending and microbending should be minimized. Avoiding microbending loss is particularly important. Glass fiber typically is about 125 microns in diameter, and coating layers of approximately 30 microns are applied thereto.

Optical fiber ribbons are described in, for example, U.S. Pat. No. 4,900,126 to Jackson et al.; 5,373,578 to Parker et al., 5,379,363 to Bonicel et al.; the complete disclosure of which is hereby incorporated by reference. Ribbon stripping is discussed in, for example:

"Testing of 4- and 8-Fiber Ribbon Strippability" by G. A. Mills in Int. Wire & Cable Symp. Proc., 1992, pgs. 472–474; and "The Effect of Fiber Ribbon Component Materials on Mechanical and Environmental Performance" by K. W. Jackson et al., in Int. Wire & Cable Symp. Proc., 1993, pgs. 28–34; which are hereby incorporated by reference. Preferably, the compositions are adapted to provide for good ribbon stripping behavior.

In addition to ribbon packaging, fiber designs can include tight buffer, loose tube, filled loose tube, and mini-bundle. Cables can be packaged by conventional buffering, stranding, and jacketing steps. Optical fiber fabrication is disclosed in, for example, the article "Fiber Optics" Encyclopedia of Chemical Technology, Vol. 10, 4$^{th}$ Ed. 1993, pg. 514–538, which is hereby incorporated by reference.

The invention will be further illustrated by means of the following non-limiting examples.

EXAMPLES

Unless indicated otherwise, radiation-cure was effected in these examples with use of 3 mil films cured under a Fusion D lamp, nitrogen atmosphere, 8 cubic feet per minute flow, at 1.0 J/cm$^2$.

A radiation-curable formulation was prepared from pre-mixture ingredients according to Table I. In Table I, the composition of Example 1 comprises a radiation-curable silane adhesion promoter also containing propoxy groups. In contrast, comparative example A comprises the silane adhesion promoter, γ-mercaptopropyltrimethoxy-silane, which does not contain propoxy groups.

TABLE I

|  | 1 | A |
| --- | --- | --- |
| COMPONENT (wt. %) | | |
| urethane acrylate oligomer[1] | 70.85 | 70.85 |
| vinyl caprolactam | 4 | 4 |
| phenoxyethyl acrylate | 18 | 18.65 |
| IRGACURE 184 (Ciba) | 4.0 | 4.0 |
| IRGANOX 1076 (Ciba) | 0.5 | 0.5 |
| CYGAURD (CYTEC) AO 711 | 1.0 | 1.0 |
| Pro 1779[2] | 1.65 | — |
| γ-mercaptopropyltrimethoxy-silane | — | 1.0 |
| PROPERTIES | | |
| viscosity (mPa.s) | 5,800 | 5,500 |
| tensile strength (MPa) | 0.6 | 0.4 |
| elongation (%) | 67 | 71 |
| secant modulus (MPa) | 1.4 | 1.0 |
| cure speed (J/cm² @ 95% cure) | 0.16 | 0.5 |
| wet adhesion (g.force) | 67 | 83 |
| dry adhesion (g.force) | 25 | 56 |

[1]urethane acrylate oligomer of a mixture of an acrylic polyol and polypropyleneglycol
[2]$[CH_2=CH\text{-}COO\{CH_2CHCH_3O\}_x\text{-}COCH_2CH_2]_2NCH_2CH_2CH_2Si(OCH_3)_3$ Examples 2–3

Radiation-curable compositions were formulated from pre-mixture ingredients according to Table II.

TABLE II

|  | 2 (control) | 3 |
| --- | --- | --- |
| COMPONENT (wt. %) | | |
| 1014-4 oligomer[1] | 65.4 | 65.30 |
| phenoxyethyl acrylate | 20.00 | 19.50 |
| isobornyl acrylate | 10.00 | 10.00 |
| LUCIRIN TPO | 3.00 | 3.00 |
| IRGANOX 1035 | 0.5 | — |
| IRGACURE 245 | — | 0.5 |
| TINUVIN 622LD | — | 0.1 |
| γ-mercaptopropyl-trimethoxy silane | 1.00 | — |
| PRO 1779 | — | 1.50 |
| BYK333 silicone (BYK-Chemie) | 0.10 | 0.10 |
| PROPERTIES | | |
| cure speed J/cm² @ 95% cure | 0.67 | 0.23 |

[1]1014-4 is prepared as a mixture of the oligomer, which is prepared from PTG-L2000 polyether polyol, IPDI (isophorone diisocyanate), and HEA (hydroxyethyl acrylate) oligomer, HEA-(IPDI-PTG-L2000)$_2$,and a monomer, ethoxylated nonylphenolacrylate. The 1014-4 oligomer for example 2 is a mixture of 50.3 wt. % oligomer and 15.1 wt. % monomer and for example 3 is a mixture of 50.2 wt. % oligomer and 15.1 wt. % monomer The adhesion of cured samples on a glass plate at 50% relative humidity and 95% relative humidity were tested using a universal testing instrument, INSTRON Model TTD. The load cell had a ten pound capacity. Glass plates, polished, 20×20 cm, (Alletch Associates catalog number 26080) were used. The test material was applied to the glass plates and cured at 1 J/cm² with a Fusion D Lamp under Nitrogen atmosphere. The thickness of the cured film was about 75 microns.

The cured films were held at 50% relative humidity, at about 23° C., for seven days prior to testing.

Test specimens, approximately 1 inch in width and 5 inches long, were cut parallel to the direction in which the drawdown of the cured film was prepared. A thin layer of talc was applied to the first and third strips on each drawdown to reduce blocking during the adhesion test.

The instrument was calibrated prior to testing. The crosshead speed was set to 10.00 inch/min. For each material, the force required to remove four test specimens from the glass plate was measured and recorded on a strip chart recorder. The value reported is the average of the four measured values. The test specimens remaining on the glass plate were then held at 95% relative humidity, at about 23° C., in an environmental chamber for 1 more day. Prior to removing the plates from the environmental chamber, a layer of slurry (fine powdered polyethylene and water) was applied to the surface of the drawdown to retain the moisture. For each material, the force to remove four test specimens from the glass plate was measured as above.

The tensile strength of cured samples was tested using a universal testing instrument INSTRON Model 4201 equipped with a personal computer and software "Series IX Materials Testing System." The load cells used were 2 and 20 pound capacity. The ASTM D638M was generally followed, with the following modifications.

A drawdown of each material to be tested was made on a glass plate and cured using a UV processor. The cured film was conditioned at 23±2° C. and 50±5% relative humidity for a minimum of sixteen hours prior to testing.

A minimum of eight test specimens, having a width of 0.5±0.002 inches and a length of 5 inches, were cut from the cured film.

To minimize the effects of minor sample defects, sample specimens were cut parallel to the direction in which the drawdown of the cured film was prepared. If the cured film was tacky to the touch, a small amount of talc was applied to the film surface using a cotton tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded.

If the top surface of the film was talc coated to eliminate tackiness, then a small amount of talc was applied to the bottom surface of test specimen after removal from the substrate.

The average film thickness of the test specimens was determined. At least five measurements of film thickness were made in the area to be tested (from top to bottom) and the average value used for calculations. If any of the measured values of film thickness deviates from the average by more than 10% relative, the test specimen was discarded. All specimens came from the same plate.

The appropriate load cell was determined by using the following equation:

$$[A \times 145] \times 0.0015 = C$$

Where: A=Product's maximum expected tensile strength (MPa); 145=Conversion Factor from MPa to psi; 0.00015= approximate cross-sectional area (in$_2$) of test specimens; and C=lbs. The 2 pound load cell was used for materials where C=1.8 lbs. The 20 pound load cell was used for materials where 1.8 (C<18 lbs). If C>19, a higher capacity load cell was required.

The crosshead speed was set to 1.00 inch/min, and the crosshead action was set to "return at break". The crosshead was adjusted to 2.00 inches jaw separation. The air pressure for the pneumatic grips was turned on and adjusted as follows: set approximately 20 psi (1.5 Kg/cm$^2$) for primary optical fiber coatings and other very soft coatings; set approximately 40 psi (3 Kg/cm$^2$) for optical fiber single coats; and set approximately 60 psi (4.5 Kg/cm$^2$) for secondary optical fiber coatings and other hard coatings. The appropriate INSTRON computer method was loaded for the coating to be analyzed.

After the INSTRON test instrument had been allowed to warm-up for fifteen minutes, it was calibrated and balanced following the manufacturer's operating procedures.

The temperature near the INSTRON Instrument was measured and the humidity was measured at the location of the humidity gage. This was done just before beginning measurement of the first test specimen.

Specimens were only analyzed if the temperature was within the range 23±1.0° C. and the relative humidity was within 50±5%. The temperature was verified as being within this range for each test specimen. The humidity value was verified only at the beginning and the end of testing a set of specimens from one plate.

Each test specimen was tested by suspending it into the space between the upper pneumatic grips such that the test specimen was centered laterally and hanging vertically. Only the upper grip was locked. The lower end of the test specimen was pulled gently so that it has no slack or buckling, and it was centered laterally in the space between the open lower grips. While holding the specimen in this position, the lower grip was locked.

The sample number was entered and sample dimensions into the data system, following the instructions provided by the software package.

The temperature and humidity were measured after the last test specimen from the current drawdown was tested. The calculation of tensile properties was performed automatically by the software package.

The values for tensile strength, % elongation, and (secant or segment) modulus were checked to determine whether any one of them deviated from the average enough to be an "outlier." If the modulus value was an outlier, it was discarded. If there were less than six data values for the tensile strength, then the entire data set was discarded and repeated using a new plate.

The viscosity was measured using a PHYSICA MC10 Viscometer. The test samples were examined and if an Viscosity excessive amount of bubbles was present, steps were taken to remove most of the bubbles. Not all bubbles need to be removed at this stage, because the act of sample loading introduces some bubbles.

The instrument was set up for the conventional Z3 system, which was used. The samples were loaded into a disposable aluminum cup by using the syringe to measure out 17 cc. The sample in the cup was examined and if it contains an excessive amount of bubbles, they were removed by a direct means such as centrifugation, or enough time was allowed to elapse to let the bubbles escape from the bulk of the liquid. Bubbles at the top surface of the liquid are acceptable.

The bob was gently lowered into the liquid in the measuring cup, and the cup and bob were installed in the instrument. The sample temperature was allowed to equilibrate with the temperature of the circulating liquid by waiting five minutes. Then, the rotational speed was set to a desired value which will produce the desired shear rate. The desired value of the shear rate is easily determined by one of ordinary skill in the art from an expected viscosity range of the sample.

The instrument panel read out a viscosity value, and if the viscosity value varied only slightly (less than 2% relative variation) for 15 seconds, the measurement was complete. If not, it is possible that the temperature had not yet reached an equilibrium value, or that the material was changing due to shearing. If the latter case, further testing at different shear rates will be needed to define the sample's viscous properties. The results reported are the average viscosity values of three test samples.

Cure speed was determined by Dose vs. Modulus curve analysis of radiation-cured sample films of approximately 75 microns thickness which were cured at each of a series of doses (0.2, 0.3, 0.5, 0.75, 1.0, and 2.0). Six specimens were cut from the center portion of each plate of the samples prepared. A Universal Testing Instrument, INSTRON Model 4201 equipped with a suitable personal computer and software "Series IX Materials Testing System" was used to measure the modulus of each specimen. The modulus measurements were then entered into the software package and the calculations were automatically performed with a determination of the average modulus for each film sample. A least squares fit of the modulus versus dose data was then performed to fit the non-linear equation:

$$\text{modulus} = K_1 \times [1 - e]^{(k_2 \times dose)}$$

This is best done using computer software such as SIGMA PLOT to generate the appropriate constraints.

The dose-modulus curve was then created by plotting the modulus values as a scatter plot and the above equation as a line.

The cure speed of the coating composition is defined as the dose at which 95% of the ultimate secant modulus is attained.

Small sections of the cured coating are placed on a microscope slide under a cover slip. These sections are immersed in one of a series of liquids of known refractive index and the resulting preparation observed through a microscope. The characteristic optical phenomenon known as the Becke' line is used to determine the extent and direction of the mismatch between the liquid and solid. Additional trials are made with other liquids from the series of known refractive indices until a match is found and the refractive index value determined.

While the invention has been described in detail and with reference to specific embodiments thereof, it will be apparent to those of ordinary skill in the art that various changes and modifications can be made therein without departing from the spirit and scope thereof.

What is claimed is:

1. A radiation-curable composition for use as an optical fiber material or coating comprising, relative to the total composition, the following pre-mixture ingredients:
   (A) about 5 wt. % to about 95 wt. % of one or more radiation-curable oligomers,
   (B) about 5 wt. % to about 95 wt. % of one or more monomer diluents,
   (C) about 0.1 wt. % to about 30 wt. % of one or more adhesion promoters represented by:

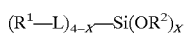

wherein $R^1$ independently represents a group comprising an ethylenically unsaturated radiation-curable group; $R^2$ independently represents a hydrolyzable group; wherein X represents an integer from 1 to 3; and L represents a linking group which comprises one or more branched propoxy groups.

2. A radiation-curable composition according to claim 1, wherein said group L further comprises at least one alkoxy groups.

3. A radiation-curable composition according to claim 1, wherein said group L comprises two or more branched propoxy groups.

4. A radiation-curable composition according to claim 1, wherein said group L further comprises an amino propyl group.

5. A radiation-curable composition according to claim 1, wherein said R group comprises an acrylate or methacrylate group.

6. A radiation-curable composition according to claim 1, wherein said oligomer comprises repeating units including polyether, polyolefin, polyester, polycarbonate and mixtures thereof.

7. A radiation-curable composition according to claim 1, wherein said oligomer is a urethane acrylate oligomer.

8. A radiation-curable composition according to claim 1, wherein said oligomer is urethane-free.

9. A radiation-curable composition according to claim 1, wherein said composition is urethane-free.

10. A radiation-curable composition according to claim 1, wherein said composition comprises at least one vinyl group containing diluent free of acrylate functionality.

11. A radiation-curable composition according to claim 1, wherein said composition is substantially free of a mercaptosilane compound.

12. A radiation-curable composition according to claim 1, wherein said composition comprises at least one monoacyl or bisacyl phosphine oxide photoinitiator.

13. A radiation-curable composition according to claim 9 further comprising about 0 wt. % to about 20 wt. % antioxidant.

14. A radiation-curable composition according to claim 1, wherein said composition is formulated to be an inner primary coating having suitable adhesion to glass and a cure speed of 0.5 $J/cm^2$ or less.

15. A radiation-curable composition according to claim 14, wherein said cure speed is 0.3 $J/cm^2$ or less.

16. A radiation-curable composition according to claim 1, wherein said composition is cured to attain at least 80% of its maximum attainable modulus.

17. A radiation-curable composition according to claim 1, wherein said composition is cured to attain at least 90% of its maximum attainable modulus.

18. A radiation-curable coating composition which has been formulated to have suitable adhesion to glass and fast cure speed, said composition having a cure speed of less than about 0.5 $J/cm^2$ at 95% of maximum attainable modulus, said composition comprising an adhesion promoter comprising at least one branched propoxy group.

19. A radiation-curable composition according to claim 1, wherein said oligomer is an acrylated acrylic oligomer.

* * * * *